United States Patent [19]

Sedgwick et al.

[11] Patent Number: 4,905,286
[45] Date of Patent: Feb. 27, 1990

[54] NOISE COMPENSATION IN SPEECH RECOGNITION

[75] Inventors: Nigel C. Sedgwick, Royston; John N. Holmes, Uxbridge, both of England

[73] Assignee: National Research Development Corporation, London, United Kingdom

[21] Appl. No.: 32,566

[22] Filed: Apr. 1, 1987

[30] Foreign Application Priority Data

Apr. 4, 1986 [GB] United Kingdom ............ 8608289

[51] Int. Cl.$^4$ ................................................ G10L 7/08
[52] U.S. Cl. ................................................. 381/43
[58] Field of Search ............... 381/46, 47, 41–45; 364/513.5

[56] References Cited

U.S. PATENT DOCUMENTS 4,239,936 12/1980 Sakoe ..................................... 381/43
4,587,670 5/1986 Levison et al. ......................... 381/43
4,720,802 1/1988 Damoulakis et al. .................. 381/43

FOREIGN PATENT DOCUMENTS 2137791 10/1984 United Kingdom .

OTHER PUBLICATIONS

J. N. Holmes et al., "Noise Compensation for Speech Recognition Using Probabilistic Models", ICASSP 86, Proceedings of the International Conference on Acoustics, Speech and Signal Processing, 7th–11th Apr. 1986, pp. 741–744, IEEE, Tokyo, Japan.
Klatt, "A Digital Filter Bank for Spectral Subtraction", IEEE ICASSP 76, pp. 573–576.

Primary Examiner—Gary V. Harkcom
Assistant Examiner—John A. Merecki
Attorney, Agent, or Firm—Cushman, Darby & Cushman

[57] ABSTRACT

In speech recognition it is advantageous to take account of noise levels both in recognition and training. In both processes signals reaching a microphone are digitized and passed through a filter bank to be separated into frequency channels. In training, a noise estimator and a masker are used with a recognizer to prepare and store probability density functions (p.d.f.s) for each channel partially defining Markov models of words to be recognized. The p.d.f.s are derived only from input signals above noise levels but derivation is such that the whole of each p.d.f. is represented. In recognition, "distance" measurements on which recognition is based are derived for each channel. If the signal in a channel is above noise then the distance is determined, by the recognizer, from the negative logarithm of the p.d.f. but if a channel signal is below noise then the distance is determined from the negative logarithm of the cumulative distance of the p.d.f. to the noise level.

20 Claims, 1 Drawing Sheet

NOISE COMPENSATION IN SPEECH RECOGNITION

FIELD OF THE INVENTION

The present invention relates to apparatus and methods for alleviating the effect of noise in sound recognition, particularly whole-word pattern matching in speech recognition using stochastic models of words.

BACKGROUND AND SUMMARY OF THE INVENTION

Improved pattern mtching has been achieved by using stochastic models of words instead of simple templates, assuming that speech can be approximated by hidden Markov processes (see "An Introduction to the Application of the Theory of Probabilistic Functions of a Markov Process to Automatic Speech Recognition" by Levinson, Rabiner and Sondhi, Bell Systems Technical Journal, Vol. 62, No. 4, April 1983, pages 1035 to 1074).

Briefly, incoming sounds are frequency analyzed by, for example, a bank of filters and the resulting signal levels in each filter are smoothed to provide estimates of the short term power spectrum (called frames) typically every 10 ms. These signals are used after further processing together with a number of probability density functions (p.d.f.s) to give the probabilities that the incoming signal producing the channel outputs corresponds to a state in a Markov model which is a finite state machine representing a word to be recognized. Each Markov model comprises a number of states and there is in general one p.d.f. for each channel relating to each state, the p.d.f.s. being obtained by previously training a recognizer using examples of words to be recognized. In operation, the recognizer employs the Markov models to calculate the word most likely to have been uttered by considering the likelihoods that a current sound arises from each of the states and the probabilities of transition from one state to another within a Markov model. The Viterbi algorithm may be used in finding the most likely word on this basis.

In practice the negative of the logarithm of a likelihood is used and in this specification is referred to for brevity as "distance", by analogy with Dynamic Time Warping (DTW) recognizers. The state p.d.f.s are often assumed to be multivariate normal distributions with diagonal covariance matrices, and so are characterised by a mean, m, and variance, s, for each filter-bank channel. This is a crude approximation to the speech signal that is currently in widespread use. The theory presented in this specification is equally applicable to stochastic models with p.d.f.s that are not multivariate normal distributions with diagonal covariance matrices.

In this specification the word "input" means the input to a speech recognizer during operational use, and "cell" means the level in a particular filter-bank channel or equivalent in a particular frame, in either input or a training. Filter-bank analysis is usually preferable for the present invention because methods of acoustic analysis that do not keep the different parts of the specturm separate (e.g. Linear Predictive Coding or cepstrum methods) are not so amenable to noise compensation. These other methods of acoustic analysis mix together noisy parts of the signal spectrum with components caused mainly by speech, and it is not then possible to identify which parts of the spectrum are contaminted by noise.

The background noise signal needs to be estimated as it varies with time. This can be done by using the microphone signal when no speech is present. It can also be done using a separate microphone which only gives the noise signal.

It has to be accepted that in conditions of high noise it is not possible in principle to distinguish between words that differ only in low-level regions of the spectrum, where they are seriously contaminated by noise. A technique is required which makes full use of any speech information in the high-level parts of the spectrum that can act as true evidence for word identity, but ignores any information that is too corrupted by noise to be useful.

When the speech in the training phase is completely uncontaminated by noise and the input cell, f, is above the input noise level, then in the case of a multivariate normal distribution with diagonal covariance matrix, the p.d.f. for each channel has the form:

$$N(f,m,s) = \frac{1}{\sqrt{2\pi s^2}} e^{\frac{-(f-m)^2}{2s^2}}$$

The distance is therefore:

$$-\ln(N(f,m,s)) = \frac{1}{2}\ln(2\pi) + \ln(s) + \frac{(f-m)^2}{2s^2}$$

However the situation is very different when the input cell is known to be noisy. Its actual value is unlikely to be sensibly related to the underlying signal, and may, in fact even be quite low because of change cancellation of signal by the noise. It is therefore necessary to use a different method to derive a distance measure for noisy input cells.

According to a first aspect of the present invention there is provided apparatus for use in sound recognition comprising means for deriving a plurality of input signals during recognition which are each representative of signal levels in respective regions in the frequency spectrum, means for storing a plurality of groups of p.d.f. values representing probability density functions indicating the likelihoods that input signals arise from states in finite state machine models of groups of sounds to be recognized, means for estimating the input noise level, and means for recognizing sounds from the input signals, the stored p.d.f. values and the models, employing respective distance measures, each derived from one input signal and one p.d.f. as represented by one group of said values, each distance measure representing a likelihood of obtaining a region signal level from one p.d.f., when the input signal is above a predetermined level related to the noise level in the corresponding spectrum region, and representing the cumulative likelihood of obtaining from the said p.d.f. a region signal level below the said predetermined level, when the input signal is below, or equal to, the predetermined level.

The groups of sounds are usually words where the apparatus is for speech recognition and the spectral regions are usually channels.

An advantage of the first aspect of the invention is that the input signals are used in obtaining the distance measures when they are reliable; that is when they are above the predetermined level which is usually near to, or at, the level. The predetermined level is used, instead of the input signals, when the input signals are unreliable. This is because the input signals are near to or below the noise level so there is no reliable information about the level of the underlying speech signal, except that it was not above the noise level. Using the cumulative distribution of the p.d.f. over all levels up to the noise level therefore gives a more reliable comparison between states than using the probability derived from the p.d.f. at the noise level.

The means for recognizing sounds may comprise means for deriving masked input signals during recognition by representing any channel of an input signal below noise level with a masking level which is representative of the noise level in that channel.

The means for estimating the input noise level may comprise a separate microphone recording the noise signal alone or means for differentiating between noise only and noise plus speech on a single microphone.

Several different distributions may be found useful in calculating likelihoods and cumulative likelihoods but the normal distribution is usually used in speech recognition. Assuming the normal distributions each likelihood measure is preferably derived from $-\ln[N(f,m,s)]$ when the noise level is below the input signal and from $-\ln[erf((A-m)/s)]$ when the noise level is above the input signal; where A is the noise level in the spectrum region corresponding to the input signal, the known cumulative distance function $$erf(y) = \int_{-\infty}^{y} N(x,0,1)dx,$$

and $N(x,0,1)$ corresponds to a normally distributed p.d.f. with independent variable x, mean equal to zero and variance equal to one.

The invention also includes methods corresponding to the first aspect of the invention.

Another problem arises in deriving groups of values representing p.d.f.s where in training the sample utterances are somewhat contaminated by noise. This particularly important in environments where the voice quality changes because of the noise, or where noise and voice quality are inseparable consequences of the environment. Examples are stress-induced voice changes in aircraft, particularly in an emergency, and shouting in high noise levels. Any solution to this problem should also give useful improvements in less severe noisy environments.

If a large proportion of the measurements used to derive and one p.d.f. are corrupted by noise, there is no prospect of making reliable estimates of the underlying speech distribution. It is, however, important for any channel that such evidence as there is to suggest that different states have different underlying distributions should be taken into account in estimating the state parameters.

Therefore, according to a second aspect of the present invention there is provided a method of training a sound recognition system comprising deriving a plurality of groups of input signals from repetitions of nominally the same sound, each group being representative of signal levels in respective regions in the frequency spectrum, and deriving a plurality of groups of p.d.f. values representing probability density functions indicating the likelihoods that input signal arise from states in finite state machine models for a vocabulary of groups of sounds to be recognized, the p.d.f. values being derived only from input signals above the noise levels in corresponding specturm regions, and the derivation being so carried out that the groups of values represent substantially whole probability functions although obtained from input signals above noise levels only.

Preferably the noise level used in each region of the frequency spectrum is the highest found in deriving the input signals for that region for all training repetitions of all sounds in the vocabulary.

If a normal distribution is assumed for each p.d.f. and the p.d.f.s. are assumed to be uncorrelated and each group of values comprises the true mean m and the true variance $s^2$, then m and s may be estimated from $$m = \frac{M \cdot erf^{-1}(F) - B \cdot Q(F)}{erf^{-1}(F) - Q(F)} \quad \text{equation 1}$$

$$s = \frac{B - m}{erf^{-1}(F)} \quad \text{equation 2}$$

where B is noise level, M is the mean of samples above the noise level, F is the proportion of input signals below the noise level, erf(F) is as defined above, and $$Q(F) = N(erf^{-}(F), 0, 1).$$

In practice $Q(F)$ and $erf^{-1}(F)$ can be found by look-up in a table of pre-computed values.

If more than half of the training cell measurements used for a state are identified as noisy, it is implied that the underlying mean is in fact below the noise level. It is then unwise to use only the tail of a distribution in an attempt to estimate the true mean and variance.

According to another feature of the invention therefore a constant mean and a constant variance are substituted for the said values in any said group representing a p.d.f. derived in training in which the proportion of input signals which are noise exceeds a predetermined value, greater than 0.5, and typically equal to 0.8.

Where the proportion is below the predetermined value equations 1 and 2 may be used, but preferably for a range of proportions between for example 0.5 and 0.8, smooth transition for mean and variance values is arranged without discontinuities by replacing B in equations 1 and 2 with a function dependent on B and F derived from a look-up table, and by appropriately modifying the tables for $erf^{-1}(F)$ and $Q(F)$ in this range of F values.

It is also preferable to add a standard minimum variance to all computed variances to overcome the danger with all stochastic models of limited training leading to the computed variances being too low by chance. If the standard minimum variance is chosen to be very large, the variances for all states are in effect made equal and the distance measure reduces to the squared Euclidean distance measure that is widely used in DTW matching. If it is made too small, there is the danger of attaching too much significance to unreliable statistics that arise through inadequate training. It is therefore desirable to set the standard minimum variance by experiment to optimise the performance under any given practical conditions.

An advantage can be obtained, if in deriving the said groups of values the standard minimum variance for a particular p.d.f. is scaled by a function of the number of input signal samples used to derive said group of values of that p.d.f. since a variance derived from a large number of samples is more likely to represent the true speech variability than an equal variance derived from only a few samples.

The invention also includes apparatus corresponding to the methods of the second aspect of the invention.

BRIEF DESCRIPTION OF THE DRAWINGS

Certain embodiments of the invention will now be described by way of example with reference to the accompanying drawings, in which.

DESCRIPTION OF THE EMBODIMENTS

Figure 1:
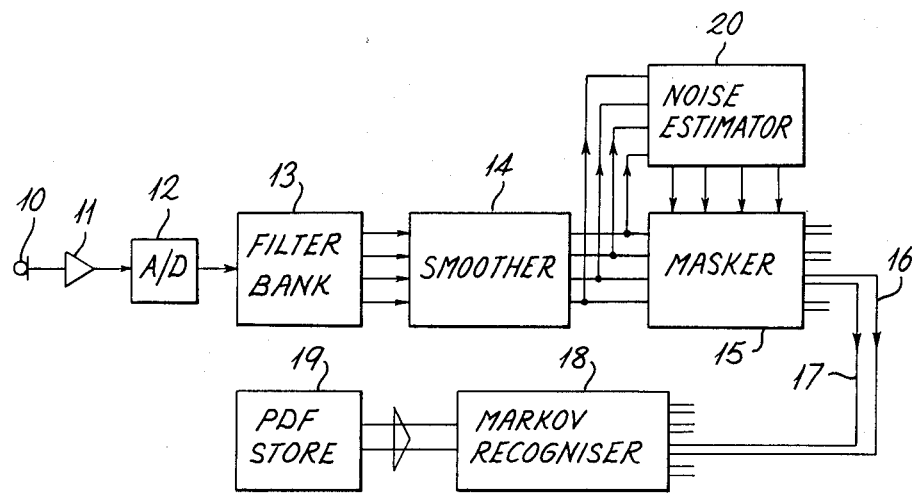
FIG. 1 is a block diagram of apparatus employing the invention.

In FIG. 1 a microphone 10 receives speech to be recognized and after passing through a non-linear amplifier 11 to allow for a wide dynamic range of input signals the resulting signals reach an analog to digital converter (A/D) 12. A digital filter bank 13 provides output signals representative of the signal levels of signals in various portions of the frequency spectrum and although only four outputs are shown there are, in practice, usually between ten and twenty. Signals from each of the bandpass filters are passed to a smoother 14 providing output signals typically every 10 ms. Each of these longer periods is known as a frame and each smoother output (corresponding to a spectrum portion) is known as a channel level, and for one frame is known as a cell.

Noise masking is now carried out in a masker circuit 15 where the input noise spectrum is analyzed by the components 10 to 14 and a noise estimator 20 in intervals in speech. The circuit 15 emits two signals for each channel, one indicating whether the signal in a channel is noise and one representative of the signal level in that channel. Two connections 16 and 17 for these signals for one channel only are shown in FIG. 1 but similar connections for other channels are also provided.

The two signals are passed to a Markov Recognizer 18 which is usually a microprocessor system or a system employing a signal processor integrated circuit. The system is programmed to carry out conventional recognition using hidden Markov models except that likeihoods (that is the distance measures) are determined according to the table below rather than always according to the first mathematical expression in the second column of the table.

| Input | Likelihood |
| --- | --- |
| Above Noise | $\ln[N(f,m,s)]$ |
| At or below noise | $\ln[\mathrm{erf}((A-m)/s)]$ |

Since the invention is concerned with inputs below noise level, consider the situation where the input signal level is at or below the input noise level. The only information reliably known about the underlying speech is that it was below the noise mask. Conditions when the means of the Markov state p.d.f. are below and above the masked input cell level are illustrated in FIGS. 2(a) and 2(b) respectively, where m is the mean and A is the input noise level.

Figure 2A:
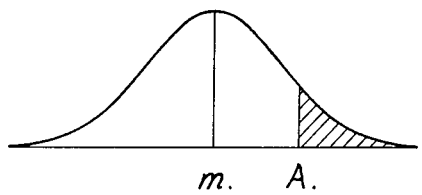
FIGS. 2(a) and 2(b) show probability density functions under different input noise conditions during recognition.
Figure 2B:
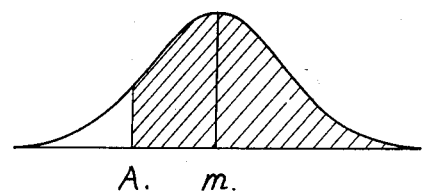

In FIG. 2(a), in relation to the model, which assumes a normal distribution of speech levels but constant (in the short term) noise, the mean of the p.d.f. is below the input noise level. This means that the input speech level did not occupy the right-hand tail of the distribution, shown, hatched. If the speech really did arise from this distribution, there is only a small probability of its giving a level above the mask and thus the observed data gives very little evidence against it being generated by the p.d.f. of FIG. 2(a). The required small distance measure is given in this case by the negative logarithm of the area of the unhatched region, which is nearly equal to the total area under the p.d.f., i.e. unity. In the case of FIG. 2(b) the converse applies. As there is only a small likelihood tht this p.d.f. would give a level in the unhatched region, the distance measure in this case is high. The cumulative distribution function of the p.d.f. is therefore used for a noise-masked input cell to estimate distnce, that is for both the situations shown in FIGS. 2a and 2b, rather than using the p.d.f. directly. The difference in treatment of noise-marked and unmarked cells shown by the above table does not cause serious problems, because it is only the relative contributions to the distance for the various states that affect the recognition decisions, and for any one input cell all distance contributions are calculated in the same way either directly from the p.d.f. or from the cumulative distribution function of the p.d.f.

In the case of a normal distribution the cumulative distribution function is not available as a simple mathematical expression, but its values depend on only one parameter, $(A-m)/s$, and are available in published tables. Where necessary linear interpolation can be used between tabulated values.

Recognition by the recognizer 18 depends on p.d.f.s relating to the states of models held by a store 19. Each p.d.f. is represented by a mean m and a variance $s^2$, the values m and s being supplied to the recognizer 18 to allow the likelihoods to be calculated according to the above table. At every frame a likelihood is calculated for each combination of an input cell and a p.d.f., and these likelihoods, transition probabilities between states of the model, and cumulative probabilities from previous frames are used to determine which sound is most likely to have been uttered in that frame. The process is known for likelihoods calculated in the conventional way, see for example the above mentioned paper by Levinson et al.

Figure 3:
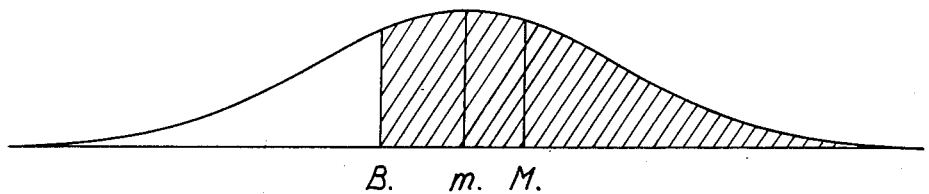
FIG. 3 illustrates the derivation of the true means from a probability density function partially masked by noise in training.

In training if less than half the measurements are noisy a resonable estimate of the mean and variance can be obtained from the truncated distribution shown in FIG. 3. Consider a normal distribution of training cell values with mean m and variance $s^2$, where a fraction, F, ($F \leq 0.5$) of the observations has been removed from the left-hand tail as a result of using a noise mask level, B. Given M (the mean of the remaining samples) and F, it can be shown that good estimators of m and s are given by equations 1 and 2 above. The apparatus of FIG. 1 is used except that the microprocessor or processor circuit used as the Markov recognizer is programmed to carry out the algoithm given below and the store 19 stores the parameters of the p.d.f.s and the Markov models.

During training each word in the vocabulary to be recognized is repeated a number of times, typically five times, and the following algorithm is carried out for each cell in each frame:

(a) Store the signal levels obtained for that cell in each frame at each repetition;

(b) Determine the appropriate masking level for each channel (for example by detecting the maximum noise level occurring during training of the whole vocabulary);

(c) Determine the proportion of stored signal levels which are above the appropriate masking level;

(d)

(1) If the proportion is greater than, or equal to, 0.5 estimate the true mean and variance from the mean and variance of those stored levels which are above the maximum noise level using equations 1 and 2; or (2) If the proportion is below, or equal to, 0.2 allocate a predetermined means and variance; or (3) If the proportion is between 0.2 and 0.5 use equations 1 and 2 to determine the mean and variance except replace B with a function dependent on the maximum noise level and the proportion F and use appropriately modified functions instead of $erf^{-1}(F)$ and $Q(F)$, for example weighted sums of these functions and constants where the weighting varies as F changes between 0.2 and 0.5;

(e) Scale a predetermined minimum variance by a function of the number of frames occurring while the current word is repeated;

(f) Add the variance determined in (d) to the scaled predetermined minimum variance determined in (e); and (g) Store the means determined in (d) and the variances determined in (f) in the store 19 to represent the p.d.f.s used in recognition.

The invention may be put into practice in many other ways than those specifically described. For example many other techniques can be employed to obtain cell outputs and some or all of the circuits 12 to 15 may be replaced by a signal processor or microprocessor. Other techniques than Markov modelling may be used for recognition and p.d.f.s of other distributions than the normal distribution may be employed. Other functions may be employed to obtain likelihoods and cumulative likelihoods during recognition and during training the true means and variances may be estimated according to other functions. Some or all of steps d(2), d(3), (e) and (f) may be omitted in obtaining values to represent p.d.f.s.

We claim:

1. Apparatus for use in sound recognition comprising:
    means for deriving a plurality of input signals during recognition, each of which is representative of a signal level in a corresponding region of a frequency spectrum in which frequency components appear when sounds to be recognized occur;
    means for storing a plurality of groups of values representing respective probability density functions, indicating likelihoods that input signals arise from states in finite state machine models of groups of sounds to be recognized;
    means for estimating an input noise level in each of said regions of said frequency spectrum; and
    means for recognizing sounds from the input signals, employing respective distance measures, each derived from one of said input signals and one of said probability density functions are represented by one group of said values, each distance measure representing, in a first circumstance, a likelihood, and, in a second circumstance, a cumulative likelihood which is cumulative from minus infinity to an upper limit, of obtaining the input signal from which that distance measure is derived from the probability function from which it is also derived,
    the first circumstance arising when the input signal from which the distance measure is derived is above a predetermined level equal to said upper limit, and set substantially at the estimated noise level in said region corresponding to that input signal, and
    the second circumstance arising when the input signal from which the distance measure is derived is below said predetermined level.

2. Apparatus according to claim 1 wherein the means for deriving input signals comprises a bank of filters, and said regions are channels corresponding to the filters.

3. Apparatus according to claim 1 wherein the means for recognizing sounds comprises means for deriving masked input signals during recognition by representing each said input signal representative of one of said signal levels which is below said predetermined level with a masking level which is representative of a noise level in said region corresponding to said each input signal, and the means for recognizing sounds employs the masked input signals, when the second circumstance arises, to derive the said distance measure representing the cumulative likelihood.

4. Apparatus according to claim 1, wherein the means for deriving input signals include a microphone and the means for estimating noise level is connected to receive signals derived from an output of said microphone, and includes means for differentiating between noise only and noise plus sounds to be recognized.

5. Apparatus according to claim 1 wherein the means for recognizing sounds includes means for deriving each said distance measure from $$1/2[l]Ln(2\pi) + [1]Ln(s) + \frac{(f-m)^2}{2s^2}$$

when said first circumstance occurs and from $-Ln(erf((A-m)/s)))$, where $$s = \sqrt{s^2}$$

when said second circumstance occurs, where A is the noise level in said region corresponding to the input signal from which that distance measure would be derived in said first circumstance, f is the input level in said region due to sounds to be recognized, m and $s^2$ are a mean and a variance, which form one group of said values and represent a probability density function (p.d.f.) from which that distance measure is derived, and $$erf(y) = \int_{-\infty}^{y} N(x,0,1)dx,$$

where $N(x, 0, 1)$ corresponds to a distributed p.d.f. with independent variable x, mean equal to zero and variance equal to one.

6. A method for use in sound recognition comprising the steps of:

deriving a plurality of input signals during recognition, each of which is representative of a signal level in a corresponding region in a frequency spectrum, said frequency spectrum being one in which frequency components appear when sounds to be recognized occur;

storing a plurality of groups of values representing respective probability density functions indicating likelihoods that input signals arise from states in finite state machine models of groups of sounds to be recognized;

estimating an input noise level in each of said regions of said frequency spectrum; and recognizing sounds from the input signals; employing respective distance measures, each derived from one of said input signals and one of the said probability density functions as represented by one group of the said values, each distance measure representing, in a first circumstance, a likelihood, and, in a second circumstance, a cumulative likelihood which is cumulative from minus infinity to an upper limit, of obtaining the input signal from which that distance measure is derived from the probability function from which it is also derived, the first circumstance arising when the input signal from which the distance measure is derived is above a predetermined level equal to said upper limit and set substantially at to the estimated noise level in said region corresponding to that input signal; and the second circumstance arising when the input signal from which the distance measure is derived is below said predetermined level.

7. A method according to claim 6 wherein the groups of sounds are words and the regions are channels defined by filtering.

8. A method according to claim 6 wherein each said distance measure is derived from $$1/2[l]Ln(2\pi) + [l]Ln(s) + \frac{(f-m)^2}{2s^2}$$

when said first circumstance occurs and from $-Ln(erf((A-m)/s))$ where $s = \sqrt{s^2}$, when said second circumstance occurs; where A is the noise level in said region of the frequency spectrum corresponding to the input signal from which that distance measure is derived, f is the input level in said region due to sounds to be recognized, and m and $s^2$ are a mean and a variance respectively which form one group of said values and represent the probability density function p.d.f. from which that distance measure is derived where $$erf(y) = \int_{-\infty}^{y} N(x,0,1)dx,$$

and N(x, 0, 1) corresponds to a normally distributed p.d.f. with independent variable x, mean equal to zero and variance equal to one.

9. A method of training a sound recognition system comprising:

deriving a plurality of groups of input signals from repetitions of nominally a same sound, each said group being representative of signal levels in a corresponding region in a frequency spectrum in which frequency components appear when sounds are to be recognized;

estimating noise levels in each of said regions of the frequency spectrum;

selecting only those of said input signals in each of said groups of input signals which represent signal levels above the estimated noise level in said corresponding regions; and deriving, from the selected input signals obtained from input signals above noise levels only, a plurality of groups of values representing respective substantially whole probability density functions, the probability density functions indicating likelihoods that input signals arise from states in finite state machine models for a vocabulary of groups of sounds to be recognized.

10. A method according to claim 9 wherein said groups of said input signals are derived for each sound in a vocabulary of sounds, said estimating noise levels step includes the step of finding a highest estimated noise level for each region for all repetitions of all sounds in said vocabulary, and said selecting step includes, for each region, choosing said estimated noise level, as said highest noise level estimated for that region.

11. A method according to claim 10 comprising the further step of estimating each said probability density function (p.d.f.) to have a normal distribution and each group of said values comprises an estimated true mean m and an estimated variance $S^2$ of the distribution.

12. A method according to claim 11 wherein for each region and each said p.d.f., m and $S^2$ are determined from $$m = \frac{M \cdot erf^{-1}(F) - B \cdot Q(F)}{erf^{-1}(F) - Q(F)}$$

$$s = \frac{B - m}{erf^{-1}(F)}$$

where B is said noise level in said each region, M is the mean of input signal levels in that region above the noise level B, F is a proportion of input signals below the noise level B, erf (F) is as defined above, and
$Q(F) = N(erf^{-1}(F), 0, 1)$, where $$erf(y) = \int_{-\infty}^{y} N(x,0,1)dx,$$

and N(x, 0, 1) corresponds to a normally distributed p.d.f. with independent variable x, mean equal to zero and variance equal to one.

13. A method according to claim 11 wherein a derived mean and a derived variance are substituted for the estimated true mean and the estimated true variance in all said groups of said values derived in training from every said region in which the proportion of input signals which are below said estimated highest noise level for that region exceeds a predetermined value greater than 0.5.

14. A method according to claim 13 wherein the predetermined value is 0.8.

15. A method according to claim 13 wherein in order to derive the derived variance a standard minimum variance is added to all true variances, the standard minimum variance having a value which is small enough to ensure that the derived variances for different states differ significantly where true variances are significantly different.

16. A method according to claim 13 wherein in deriving said derived variance, a scaled minimum variance is added to each true variance, the scalling of the scaled minimum variance for a particular p.d.f. being derived from the number of input signal samples used to derive the said group of values for that p.d.f.

17. A method according to claim 13 wherein the derived mean and the derived variance have predetermined fixed values.

18. A method according to claim 13 wherein for every said region in which said proportion is between the predetermined value and a lower further predetermined value, a substitute mean and a substitute variance are substituted for the estimated true mean and the estimated true variance, over the range between the two predetermined values, the substitute mean and the substitute variance being taken from a smooth transition from said derived mean to a predetermined fixed mean and from said derived variance to a predetermined fixed variance, respectively, according to position in said range.

19. A method according to claim 10 wherein each probability density function is assumed to have a normal distribution and each group of said values comprises an estimated true mean and a modified variance which is the sum of an estimated line variance and a predetermined minimum variance sealed by a fixed value.

20. A method according to claim 10 wherein each probability density function is assumed to have a normal distribution and each group of said values comprises an estimated true mean and a modified variance which is the sum of an estimated true variance, calulated from a number of said input signals, and a predetermined minimum variance scaled by a value dependent on said number of input signals used to calculate the estimated true variance.

* * * * *